Feb. 17, 1970  L. R. PHILLIPS  3,495,606
DAMPER VALVE FOR VENTILATING DUCTS
Filed Aug. 5, 1965  3 Sheets-Sheet 1
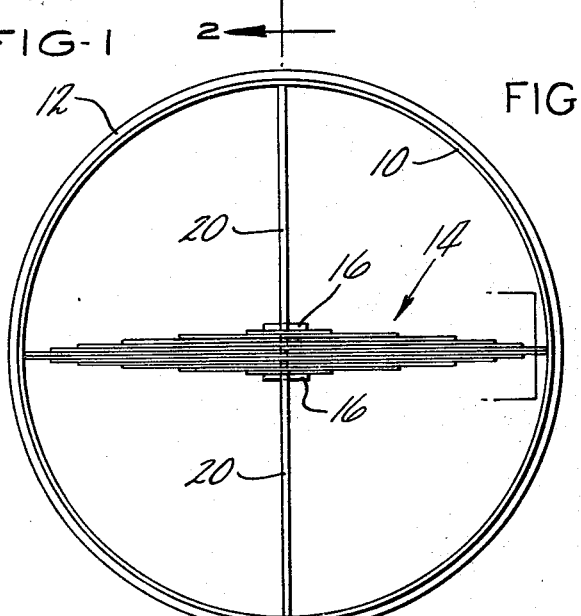
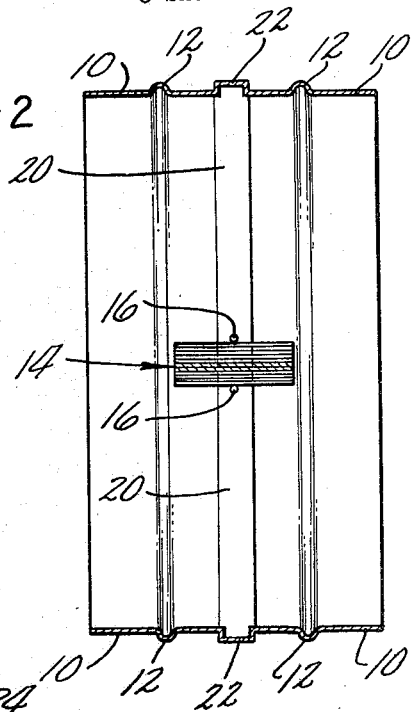
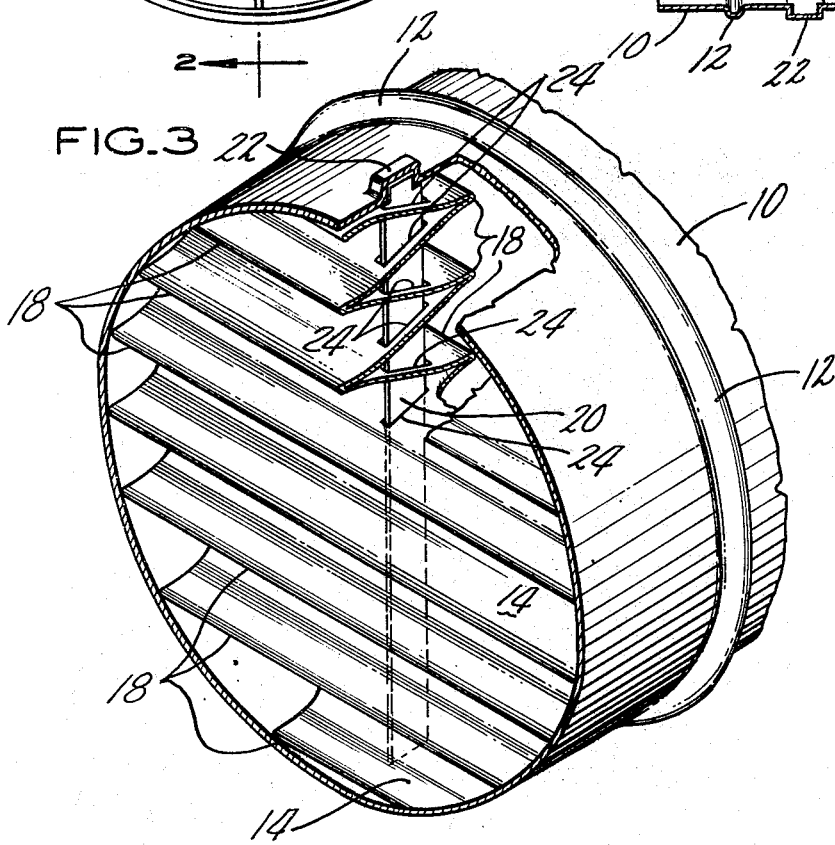
INVENTOR
LEONARD R. PHILLIPS
BY McCormick, Paulding & Huber
ATTORNEYS

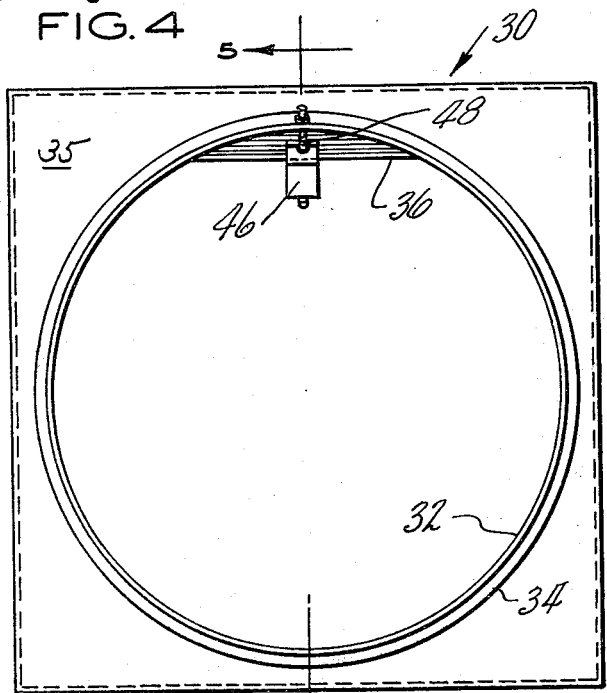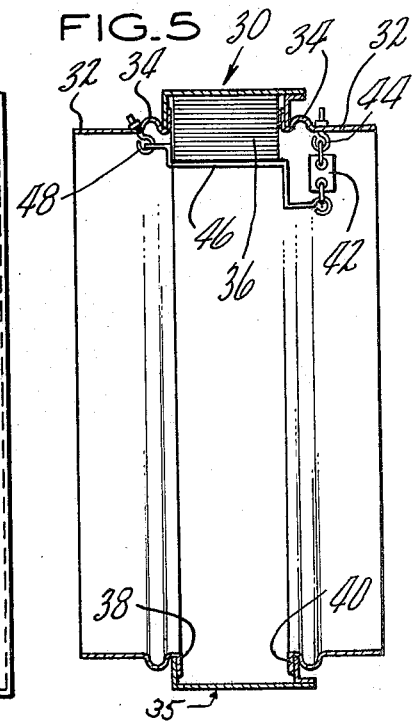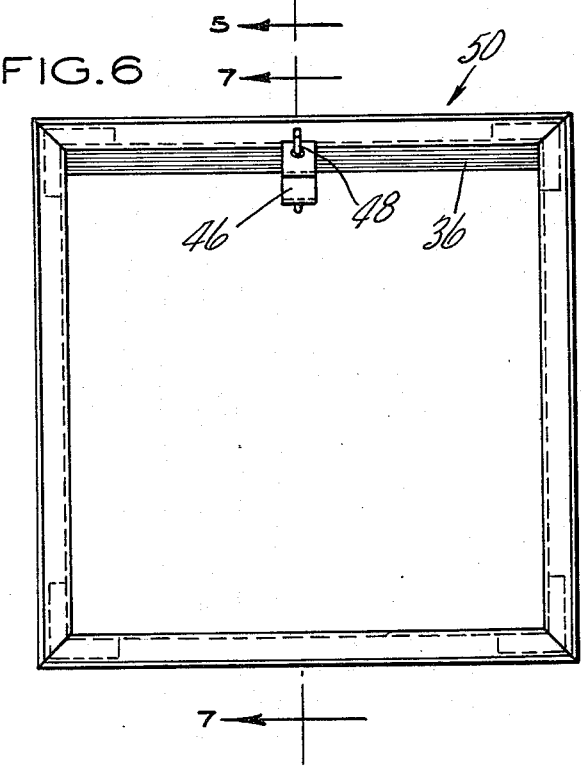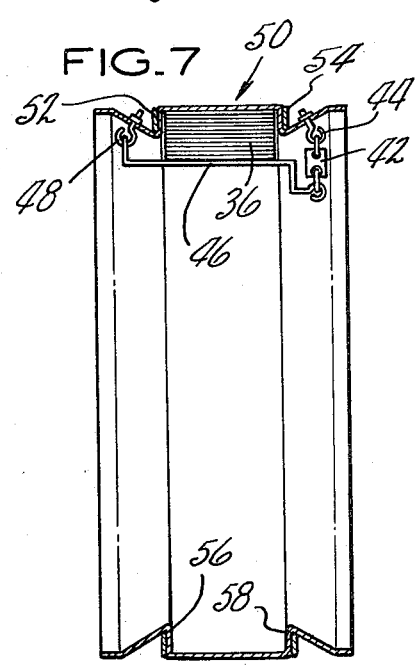
Feb. 17, 1970 — L. R. PHILLIPS — 3,495,606
DAMPER VALVE FOR VENTILATING DUCTS
Filed Aug. 5, 1965 — 3 Sheets-Sheet 2
INVENTOR
LEONARD R. PHILLIPS
BY McCormick, Paulding & Huber
ATTORNEYS Feb. 17, 1970   L. R. PHILLIPS   3,495,606
DAMPER VALVE FOR VENTILATING DUCTS
Filed Aug. 5, 1965   3 Sheets-Sheet 3
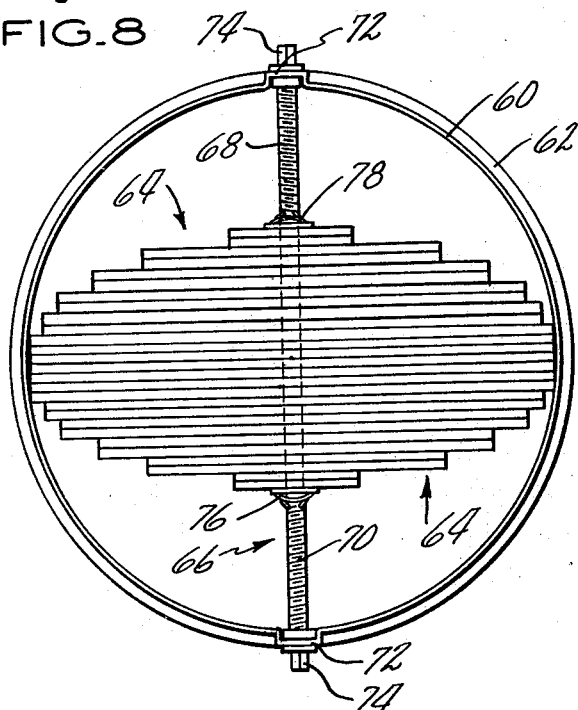
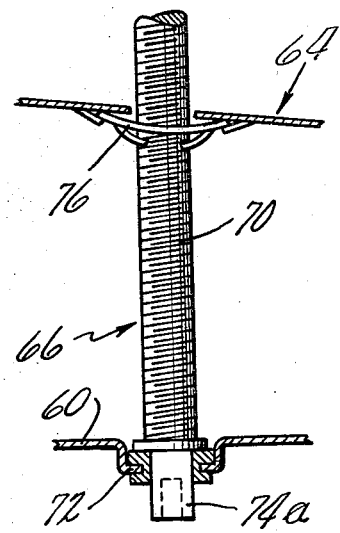
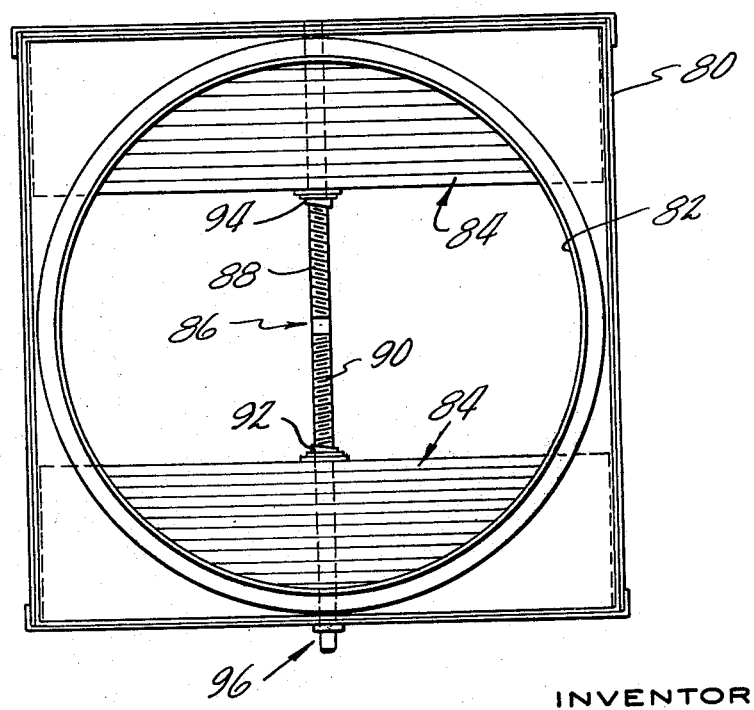
INVENTOR
LEONARD R. PHILLIPS
BY McCormick, Paulding & Huber
ATTORNEYS

United States Patent Office 3,495,606
Patented Feb. 17, 1970

3,495,606
DAMPER VALVE FOR VENTILATING DUCTS
Leonard R. Phillips, Hartford, Conn., assignor, by mesne assignments, to Sterling Radiator Co., Inc., a corporation of Massachusetts
Filed Aug. 5, 1965, Ser. No. 477,545
Int. Cl. F16k *13/00, 17/40;* E06b *3/94*
U.S. Cl. 137—75       14 Claims

ABSTRACT OF THE DISCLOSURE

A sheet metal damper valve member is provided for use in a duct, being mounted on a diametrically extending strut, or in a rectangular housing somewhat larger than the exterior dimensions of the duct. The damper member comprises a series of generally rectangular panel portions connected to one another along parallel fold lines with central sections of each of said panel portions being inclined with respect to a transverse plane perpendicular to longitudinal axis of the duct when the damper member is in a closed position lying spread across the duct. The natural resiliency of the sheet metal member tends to spread the same toward this closed position, and means is provided for releasably retaining the member in an opened position wherein these central sections of the rectangular panel portions lie adjacent one another and generally perpendicular to the above-mentioned transverse plane. Each of the panel portions further includes marginal side edge sections which are integrally connected to one another along said folds in a pinched configuration wherein the adjacent marginal side edge sections are bent back upon one another to substantially 180° when the member is in its closed position.

---

This invention relates to valves for use with ventilating ducts or the like and deals more particularly with a damper valve construction wherein the damper member is continuously urged into a closed position in the duct as a result of the inherent resiliency of the damper member itself.

A general object of the present invention is to provide a damper valve construction wherein the damper member is quite thin and formed of bent sheet metal in such a manner that it will not distort and become inoperable due to high temperature or to high pressure air flow in the duct, or due to high pressure water played on the valve in the event of fire.

A more specific object of the present invention is to provide a damper valve construction which is of light weight sheet metal construction and occupies a minimum of space so as to be well adapted to low cost high quantity production, which valve is also quite rugged in construction and has a minimum number of moving parts.

Still another specific object of the present invention is to provide a damper valve construction which is especially well suited to use as a fire stop in a ventilating duct.

Still another specific object of the present invention is to provide a damper valve construction which is especially well suited to use as a volume or flow control damper in a ventilating duct.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:
FIG. 1 is an elevational view of a damper valve of the present invention adapted for use as a fire stop in a ventilating duct, the damper member being shown in its open position.
FIG. 2 is a sectional view of the FIG. 1 valve and is taken along the line 2—2 of that figure.
FIG. 3 is a perspective view of the FIG. 1 valve as it would appear in a closed position with portions of the damper member and the duct-receiving collar member broken away.
FIG. 4 is a view generally similar to FIG. 1 but showing an alternative valve construction according to the present invention.
FIG. 5 is a sectional view of the FIG. 4 valve taken along the line 5—5 of that figure.
FIG. 6 is a second alternative valve construction taken from the same vantage point as FIGS. 1 and 4.
FIG. 7 is a sectional view of the FIG. 6 valve taken along the line 7—7 of that figure.
FIG. 8 is a view which is again similar to FIG. 1 but shows still another alternative valve construction of the present invention with the damper member in a position intermediate the open and closed positions referred to above.
FIG. 9 is a detail of a portion of the damper supporting shaft member of FIG. 8.
FIG. 10 is an elevational view of still another alternative embodiment of a damper valve constructed in accordance with the present invention.

Turning now to the drawings in greater detail, and more particularly to the embodiment shown in FIG. 1, a damper valve assembly is there shown as comprising collar means 10 of annular cross section for connection with the open end of a circular duct (not shown). While not necessarily so limited, the annular collar 10 will be seen from FIG. 2 to be so constructed as to receive the open ends of two axially aligned ducts as a result of a symmetry about a transverse plane perpendicular to the axis of the collar member and generally centered therein. Preferably, and as shown, the annular collar 10 has two axially spaced annular beads 12, 12 which serve to strengthen the collar and to provide an abutment against which the open ends of said circular ducts can be secured.

In accordance with the present invention, a thin sheet metal damper member is supported for movement along the aforementioned transverse plane between the compacted position shown in FIG. 1 wherein the valve assembly is open, and the closed position shown in FIG. 3 wherein the natural resiliency of the damper member 14 causes it to spread across the collar and across said duct. In the embodiment shown, suitable means are provided for releasably retaining the damper member in its open position and when used as a fire stop, said means comprises two heat fusible elements 16, 16, and the damper member 14 is preferably made of a high temperature resistant sheet metal material such as chromium alloy steel or the like.

Turning now to a more detailed description of the damper member 14, FIG. 3 shows said member as having a series of parallel chordwise folds formed therein as indicated at 18, 18. The member 14 thus has a pleated appearance and the folds 18, 18 define generally rectangular panel portions therebetween. Each of the folds will be seen to have a chordwise extent corresponding to a particular radial displacement from the axis of the collar 10 so that the intermediate panel portions each engage corresponding arcuate portions of the collar closing off the duct as shown. With further reference to the intermediate panel portions, each will be seen to be inclined with respect to the aforementioned transverse plane when the damper member 14 is located across the collar in its closed position.

Referring now to the cross sectional shape of the damper member 14, FIG. 3 shows each panel portion as having a generally flat center section and opposite marginal side edges integrally connected thereto and to the adjacent panel portions in a pinched configuration along their common bend lines 18, 18. As so constructed the pleated sheet metal damper member is bent back upon itself through substantially 180 degrees at the bend lines 18, 18 and each panel has a center section which is inclined at approximately 45° with respect to the aforementioned transverse plane when said member is in the closed position shown.

Suitable means are provided for mounting the damper member 14 in the annular collar 10 so that the generally rectangular panel portions are movable with respect to said transverse plane. As shown, said means comprise an elongated strut 20 which is connected at each of its ends to diametrically opposed lands 22, 22 in the collar 10. Preferably, and as shown, said lands comprise generally rectangular receptacles or sockets corresponding in shape to the rectangular cross section of the strut 20 and as so constructed it will be apparent that the strut can be assembled in the collar 10 without the use of any fasteners or the like by merely bending the strut and then letting it spring into place.

The damper member 14 is slidably received on the strut 20 by virtue of rectangular openings 24, 24 defined centrally of the panel portions of the damper member 14. As a result of the rectangular cross section of the strut, and the complementary shape of these openings 24, 24, the damper member 14 is non-rotatably received on the strut 20 and hence adapted to move only in and along the aforementioned transverse plane. The strut 20 is preferably quite thin so as to not interfere with the passage of ventilating air through the duct with the valve open as shown in FIG. 1.

The two heat fusible elements 16, 16 are carried by the strut and engage the respective panel portions of said damper member which are most remote from the collar axis. These elements 16, 16 retain the damper member 14 in a compacted position wherein it is generally centered on the strut in perpendicular relation thereto. It will be apparent that the natural resiliency of the member 14 tends to urge the same toward the closed position shown in FIG. 3 when the fusible elements 16, 16 fail due to excessive heat in the duct.

The advantages to the pleated damper valve construction described above will be obvious from a consideration of conventional fire stops. The conventional approach to fire stop construction for ventilating ducts has usually resulted in massive boiler plate type valve members thick enough to withstand both the high temperatures encountered when flames exist in the duct, and also to resist the relatively cold high pressure water stream from a fire hose played into the duct. The fire damper valve assembly described hereinabove seeks to avoid the radical temperature gradients across such a massive valve member by providing a very thin damper member which is nevertheless strong enough to resist the force of cold water applied thereto when it has been heated as a result of surrounding flames. This is accomplished in part by resorting to a high temperature resistant metal such as chromium alloy steel, and in part by the very thinness of the member 14, which permits quicker heat dissipation across the damper. It is the latter feature of the present invention which is thought to contribute greatly to the reduction of the buckling and distortion characteristics of the massive fire dampers heretofore available.

Turning now to the alternative damper valve construction shown in FIG. 4, a different collar means 30 is provided for receiving the open end of axially aligned ducts (not shown). In accordance with this embodiment of the present invention, an annular portion 32 is provided at each axial end of the collar means 30 to receive circular ducts. Annular beads 34, 34 are also provided to stiffen said collar means. The collar means 30 further comprises a generally rectangular portion 35 intermediate the annular portions 32, 32 for housing the pleated damper member 36. As best shown in FIG. 5, the hollow rectangular center portion of said collar means 30 further defines axially spaced interior wall surfaces 38 and 40 which face one another and extend radially outwardly beyond the periphery of the annular portions 32, 32. The damper member 36 like the member 14 described hereinabove with reference to the FIG. 1 embodiment, comprises a thin sheet metal material of high temperature resistance having a series of laterally extending parallel folds formed therein. These folds are equidistantly spaced from one another and define equal rectangular panel portions therebetween each of which extends substantially all of the way across the rectangular portion of the collar means 30. The damper member 36 is in fact similar to the member 14 in all respects except for the absence of openings 24, 24 and except for the overall rectangular shape of the damper member dictated by the rectangular shape of the collar means 30.

In the open position shown in the drawing at FIGS. 4 and 5, the damper member 36 will be seen to have its panel portions compacted at one side of the rectangular hollow collar portion 35. The rectangular hollow collar portion 35 extends beyond the periphery of the annular portion 32 and thereby provides a convenient space for receiving the compacted damper member 36.

It will be apparent that the damper member 36 is adapted to lie generally across the hollow rectangular collar means in a closed position wherein the marginal end portions of the laterally extending parallel folds engage the axially spaced interior wall surfaces 38 and 40 for restricting movement of the damper member to movement in a transverse plane across the collar 30. As mentioned hereinabove with reference to the previous embodiment, the natural resiliency of the damper member 36 tends to urge the same toward said closed position and linkage means best shown in FIG. 5 is provided for retaining the damper member in the open position shown. In accordance with the present invention, the linkage means includes a fusible link 42 which is connected at one end to an eyelet attached to the annular portion 32 and at the other end to a pivotable damper member retaining link 46 which link is in turn pivotally connected to a second eyelet 48 in the annular portion 32 as shown. As so constructed, when the fusible element 42 fails due to excessive heat in the duct, the link 46 falls away to permit the damper member to spread.

The embodiment shown in FIGS. 6 and 7 is generally similar to that just described with reference to FIGS. 4 and 5 except that the rectangular collar means 50 is adapted for use with a ventilating duct of rectangular cross section. Preferably, and as shown, at least one end of the collar means 50 is also rectangular to receive the duct (not shown). From FIG. 7 it will be apparent that the exterior dimensions of the collar means 50 are substantially the same as those of the rectangular duct with which this device would be used. Still with reference to FIG. 7, the collar means 50 will be seen to have two longitudinally spaced inwardly turned flanged portions indicated generally at 52 and 54, each of which defines an interior wall surface, 56 and 58 respectively. The wall surfaces 56 and 58, like the surfaces 38 and 40 discussed hereinabove with reference to the previous embodiment, face one another in axially spaced relation in the collar means 50 and extend peripherally around the inside of said collar means 50. Linkage means, including a heat fusible element 42, is provided at one side of the collar means 50 for retaining the damper member 36 in its compacted position at one side of the collar member and upon failure of the fusible element 42 said member will move toward its closed position as a result of its natural resiliency.

While the features of the present invention are perhaps best suited to a fire stop type damper valve construction, it will be apparent that the pleated valve member can be adapted for use as a volume or flow control valve. FIGS. 8 and 9 show such a flow control valve assembly adapted for use with an elongated ventilating duct of circular cross section. The valve assembly shown comprises an annular collar 60 which is generally similar to the collar 10 described with reference to the FIG. 1 embodiment. Annular ribs 62, 62 are provided for stiffening the collar member 60. A sheet metal damper member 64 generally similar to the member 14 described hereinabove with reference to FIG. 1, is mounted in the collar 60 so that rectangular panel portions thereof are movable in a transverse plane perpendicular to the axis of the collar to define a valve open position generally similar to that shown in FIG. 1, a valve closed position generally similar to that shown in FIG. 3, and positions intermediate thereof, as for example, the position shown in FIG. 8. The member 64 has a series of parallel chordwise folds formed therein generally similar to those described hereinabove with reference to FIG. 1 and each of these folds will be seen from FIG. 8 to have a chordwise extent corresponding to a particular radial displacement from the axis of the collar 60.

Preferably and as shown, the means for mounting the damper member 64 in the collar comprises a shaft member 66 having right and left-hand threaded portions 68 and 70 respectively. The shaft member 66, like the strut 20 described hereinabove with reference to FIG. 1, is connected at each of its ends to diametrically opposed lands 72, 72 defined in the collar 60. Preferably, and as shown, said lands comprise suitable receptacles for rotatably supporting the end portions of the shaft member 66. In this embodiment the shaft member protrudes through these lands and has a tool engageable portion 74 at each end to permit the shaft to be rotated from outside the collar and outside the duct to which it is connected. FIG. 9 shows an alternative tool engageable shaft end portion 74a adapted for use with a conventional screwdriver or the like. While the shaft member 66 is shown as protruding through both lands 72, 72 as indicated at 74, 74 it will be apparent that this shaft 66 could be rotated so as to position the damper member 64 in the collar with only one end of said shaft member protruding outside the collar 60.

As mentioned, the damper member is generally similar to the member 14 described hereinabove and openings are provided in each of the panel portions thereof to slidably receive the damper member in the same manner as that shown in FIG. 3. In order to achieve a continuous range of adjustments between the full open and full closed positions just described, left and right-hand threaded nuts, 76 and 78 respectively, are attached to the two respective panel portions most remote from the axis of the collar, as shown in detail in FIG. 9. These nuts 76 and 78 are threadably received on the corresponding left and right-hand threaded shaft portions 70 and 68 so that rotation of the shaft member in one direction compacts said damper member and rotation thereof in the opposite direction expands said damper member. As so constructed, it will be apparent that the nuts retain the damper member in any one of the positions mentioned hereinabove.

FIG. 10 shows an alternative flow control valve assembly generally similar to that described with reference to FIGS. 8 and 9 except that the FIG. 10 embodiment is adapted for use with a rectangular collar means 80. While the rectangular collar means could be used with a duct of rectangular section as described hereinabove with reference to FIGS. 6 and 7, the present embodiment is adapted for use with ducts of circular cross section and has an annular portion 82 for receiving the same. The collar means 80 defines axially spaced interior wall surfaces which face one another and extend radially outwardly beyond the periphery of the annular portion 82.

The sheet metal damper members 84, 84 are housed in opposite sides of the rectangular collar means 80 and each of these has a series of laterally extending parallel folds formed therein as described hereinabove with reference to the damper member 36 shown in FIGS. 6 and 7. The panel portions of each of these damper members 84, 84 extend across the rectangular collar means 80, and are inclined at similar angles to a transverse plane perpendicular to the axis of the duct when each of these damper members is lying across one half of the collar. Two mutually related axially spaced interior wall surfaces defined by said collar means are adapted to engage the marginal end portions of the laterally extending folds of each of the damper members 84, 84 restricting the same for movement in said transverse plane.

A shaft member 86 having right and left-hand threaded portions 88 and 90, respectively, is rotatably supported at each end in suitable journals defined at the midpoints of the opposite sides of the rectangular collar means 80. The panel portions of the damper members 84, 84 have aligned openings defined therein to slidably receive the shaft member 86 as described above with reference to the member 64 shown in FIG. 8. The panel portions closest to the axis of the collar 80 carry left and right-hand nuts 92, and 94 respectively which are threadably received on the threaded portions of the shaft 86 so that rotation of the latter in one direction compacts both of said damper members in a stowed configuration in opposite sides of the housing 80 and rotation thereof in the opposite direction expands the damper members to positions wherein each closes off one half of the open area defined by the annular portion 82. As mentioned with reference to FIGS. 8 and 9, these nuts 92 and 94 are adapted to retain the damper member 84, 84 in the open and closed positions just described and also in any position intermediate thereof. At least one end of the threaded shaft member 86 protrudes through the rectangular collar 80 and has a suitable tool engaging end portion 96 permitting the shaft member 86 to be rotated from outside the collar 80 and outside the ducts to which it is attached.

This invention claimed is:

1. A damper valve for use with an elongated ventilating duct, said valve comprising at least one thin sheet metal damper member, said member having a series of parallel folds formed therein and defining generally rectangular panel portions therebetween, each of said panel portions having a central section which is inclined with respect to a transverse plane perpendicular to the longitudinal axis of the duct when said damper member is in a closed position lying spread across said duct, each of said panel portions further including marginal side edge sections which are integrally connected to one another along said folds in a pinched configuration wherein the adjacent marginal side edge sections are bent back upon one another through substantially 180° when said member is in said closed position, said rectangular panel portions being movable with respect to said transverse plane to an open position wherein they are compacted so that said central sections lie generally perpendicular to said transverse plane, and means for releasably retaining said member in said open position, the natural resiliency of said damper member tending to spread the same toward said closed position when said last-mentioned means is released.

2. A damper valve as set forth in claim 1 wherein said folds are equidistantly spaced from one another and wherein said central panel sections are each inclined with respect to said transverse plane at the same angle when said damper member is in said closed position.

3. A damper valve as set forth in claim 1 and further characterized by means for restricting movement of said damper member to movement in said transverse plane.

4. A damper valve assembly for use with an elongated ventilating duct, said valve assembly comprising a hollow generally rectangular collar means adapted to receive an open end of said duct in longitudinally aligned relation therewith, at least one thin sheet metal damper member in said collar means and having a series of laterally extending parallel folds formed therein, said folds defining generally rectangular panel portions therebetween each of which extends substantially across said hollow collar means, each of said panel portions having a central section which is inclined with respect to a transverse plane perpendicular to the longitudinal axis of the duct when said damper member is lying generally across said hollow collar means in a closed position, each of said panel portions further including marginal side edge sections which are integrally connected to one another along said folds in a pinched configuration wherein the adjacent marginal side edge sections are bent back upon one another through substantially 180° when said member is in said closed position, said rectangular panel portions being movable in said transverse plane to define an open position when said central sections thereof are arranged generally perpendicular to said transverse plane in compacted relationship, and means for releasably retaining said damper member in said open position, the natural resiliency of said damper member tending to spread the same toward said closed position when said last-mentioned means is released.

5. A damper valve assembly as set forth in claim 4 wherein said folds are longitudinally equidistantly spaced from one another when said damper member is in said open position and wherein said central sections of said rectangular panel portions are each inclined with respect to said transverse plane at the same angle when said valve member is in said closed position.

6. A damper valve assembly as set forth in claim 5 wherein said hollow collar means includes two longitudinally spaced peripherally extending abutment surfaces which face one another and which engage the marginal end portions of said laterally extending parallel folds of said damper member during movement of said valve member between said open and closed positions whereby said valve member is restricted to movement in said transverse plane.

7. A damper valve assembly for use with an elongated ventilating duct of circular cross section, said valve assembly comprising an annular collar adapted to receive an open end of said circular duct in axially aligned relation therewith, at least one sheet metal damper member in said collar, said member having a series of parallel chordwise folds formed therein, said folds defining generally rectangular panel portions therebetween, each of said folds having a chordwise extent corresponding to a particular radial displacement from said collar axis, said panel portions being inclined with respect to a transverse plane perpendicular to said collar axis when said damper member is spread across said annular collar in a closed position, means for mounting said damper member in said collar so that said rectangular panel portions are movable in said transverse plane and define an open position when they are compacted with respect to one another and lie generally perpendicular to said plane, and means for releasably retaining said member in said open position, the natural resiliency of said damper member tending to urge the same toward said closed position when said last-mentioned means is released.

8. A damper valve assembly as set forth in claim 7 wherein said means for mounting said damper member in said collar comprises an elongated strut connected at each of its ends to diametrically opposed lands in said annular collar, said panel portions having openings therein to receive said strut.

9. A damper valve assembly as set forth in claim 8 wherein said means for releasably retaining said damper member in its open position is carried by said strut and comprises two damper member engaging elements adapted to abut the respective rectangular panel portions most remote from said collar axis.

10. A fire damper valve assembly for use with an elongated ventilating duct of circular cross section, said valve assembly comprising an annular collar adapted to receive an open end of said circular duct in axially aligned relation therewith, a sheet metal damper member of high temperature fire resistant material located in said collar, said member having a series of parallel chordwise folds formed therein, said folds defining generally rectangular panel portions therebetween, each of said folds having a chordwise extent corresponding to a particular radial displacement from said collar axis, each of said panel portions being inclined with respect to a transverse plane perpendicular to said collar axis when said damper member is spread across said annular collar in a closed position, an elongated stationary strut anchored at each of is respective ends in diametrically opposed receptacles defined by said annular collar, said panel portions having openings therein to slidably and nonrotatably receive said stationary strut for movement of said panel portions with respect to said transverse plane toward said closed position from an open position wherein said panel portions are compacted centrally of said strut in perpendicular relation to both said strut and said transverse plane, and two heat fusible elements carried by said strut for engaging the respective panel portions most remote from said collar axis and compacting said damper member to retain the same in said open position wherein said member is generally centered on said strut, the natural resiliency of said member tending to spread the same toward said closed position when said fusible elements fail due to excessive heat in the duct.

11. A fire damper valve assembly for use with an elongated ventilating duct of circular cross section, said valve assembly comprising a hollow generally rectangular collar means having at least one annular portion for receiving the open end of said circular duct in axially aligned relation therewith, said collar means further defining axially spaced interior wall surfaces facing one another and extending radially outwardly beyond the periphery of said annular portion, a thin sheet metal damper member of high temperature resistant material located in said collar means and having a series of laterally extending parallel folds formed therein, said folds being equidistantly spaced from one another and defining equal rectangular panel portions therebetween, each of which panel portions having a central section which extends across said collar means and is inclined with respect to a transverse plane perpendicular to the axis of said annular portion when said damper member is lying spread across said hollow collar means in a closed position wherein the marginal end portions of said laterally extending parallel folds are adapted to engage said axially spaced interior wall surfaces, each of said panel portions further including marginal side edge sections which are integrally connected to one another along said folds in a pinched configuration wherein the adjacent marginal side edge sections are bent back upon one another through substantially 180° when said member is in said closed position, said panel portions being restricted by said wall surfaces to movement in said transverse plane toward said closed position from an open position wherein said central sections are compacted at one side of said hollow collar means in generally perpendicular relation to said transverse plane, and linkage means including a heat fusible element for retaining said damper in its open position wherein the same is compacted at one side of said hollow collar means to define said open position, the natural resiliency of said member tending to spread the same toward said closed position when said fusible element fails due to excessive heat in the duct.

12. A damper valve assembly for use with an elongated ventilating duct of rectangular cross section, said valve assembly comprising a hollow rectangular means of bent sheet metal for receiving an open end of said duct, said collar means having substantially the same exterior dimensions as said rectangular duct but including two longitudinally spaced inwardly turned flanged portions which define mutually facing interior wall surfaces extending peripherally around the inside of said collar means, a thin sheet metal damper member of high temperature resistant material located in said collar means and having a series of laterally extending parallel folds formed therein, said folds being equidistantly spaced from one another and defining equal rectangular panel portions therebetween each of which panel portions extends across said collar means, each of said panel portions having central sections which are inclined at similar angles to a transverse plane perpendicular to the axis of said annular portion when said damper member is lying spread across said hollow collar means in a closed position wherein the marginal end portions of said laterally extending parallel folds are adapted to engage said axially spaced interior wall surfaces, each of said panel portions further including marginal side edge sections which are integrally connected to one another along said folds in a pinched configuration wherein the adjacent marginal side edge sections are bent back upon one another through substantially 180° when said member is in said closed position, said panel portions being restricted by said wall surfaces to movement in said transverse plane toward said closed position from an open position wherein said central sections are compacted at one side of said hollow collar means in generally perpendicular relation to said transverse plane, and linkage means including a heat fusible element for retaining said damper member in its open position, the natural resiliency of said member tending to spread the same toward said closed position when said fusible element fails due to excessive heat in the duct.

13. A flow control valve assembly for use with an elongated ventilating duct of circular cross section, said valve assembly comprising an annular collar adapted to receive an open end of said circular duct, a thin sheet metal damper member of thin flexible material located in said collar, said member having a series of parallel chordwise folds formed therein, said folds defining generally rectangular panel portions therebetween, each of said folds having a chordwise extent corresponding to a particular radial displacement from said collar axis, each of said panel portions having a central section which is inclined with respect to a transverse plane perpendicular to said collar axis when said damper member is spread across said annular collar in a closed position, each of said panel portions further including marginal side edge sections which are integrally connected to one another along said folds in a pinched configuration wherein the adjacent marginal side edge sections are bent back upon one another through substantially 180° when said member is in said closed position, a shaft member having right and left-hand threaded portions, said annular collar defining diametrically opposed lands in which the respective ends of said shaft member are rotatably supported, said central sections having openings therein to slidably receive said shaft member for movement of said panel portions toward said closed position from an open position wherein said central sections are compacted centrally of said member in perpendicular relation to both said shaft member and said transverse plane, and left and right-hand threaded nuts carried by the two respective panel portions most remote from said collar axis, said nuts being threadably received on said threaded shaft so that rotation of the latter in one direction compacts said damper member, and said nuts being adapted to retain said member in said open position and in any position intermediate of said open and closed positions.

14. A flow control valve assembly for use with an elongated ventilating duct of circular cross section, said valve assembly comprising a hollow generally rectangular collar means having at least one annular portion for receiving the open end of said circular duct, said collar means further defining axially spaced interior wall surfaces facing one another and extending radially outwardly beyond the periphery of said annular portion thereof, two thin flexible damper members housed in opposite sides of said rectangular collar means, each of said members having a series of laterally extending parallel folds formed therein, said folds being equidistantly spaced from one another and defining rectangular panel portions therebetween, each of said panel portions extending across said collar means, said panel portions having central sections which are inclined at similar angles to a transverse plane perpendicular to the axis of said annular portion when each of said damper members is spread across one half of said hollow collar means closing off the hollow portion thereof and defining a closed position wherein marginal end portions of the folds of each of said members engage said axially spaced interior wall surfaces, each of said panel portions further including marginal side edge sections which are integrally connected to one another along said folds in a pinched configuration wherein the adjacent marginal side edge sections are bent back upon one another through substantially 180° when said member is in said closed position, a shaft member having right and left-hand threaded portions and rotatably supported at each its ends by the collar means, said central sections having openings therein to slidably receive said shaft member for movement of said panel portions toward said closed position from an open position wherein said central sections are compacted at opposite sides of said collar means adjacent the ends of said shaft member in perpendicular relation to both said shaft member and said transverse plane, and left and right-hand threaded nuts carried by the two respective panel portions closest to said collar axis, said nuts being received on said shaft so that rotation of the latter in one direction compacts both of said damper members, and said nuts being adapted to retain said members in said open positions and in any position intermediate said open and closed positions.

References Cited

UNITED STATES PATENTS

| | | |
|---|---|---|
| 581,358 | 4/1897 | Mayer. |
| 848,853 | 4/1907 | Reed. |
| 3,111,076 | 11/1963 | Martin et al. |
| 3,273,632 | 9/1966 | McCabe. |
| 3,312,159 | 4/1967 | Shepherd. |
| 2,221,059 | 11/1940 | Persson _____ 160—84 |

WILLIAM F. O'DEA, Primary Examiner

R. GERARD, Assistant Examiner

U.S. Cl. X.R.

49—7; 98—86; 160—5, 84; 251—212, 326

PO-1050
(5/69)

UNITED STATES PATENT OFFICE
CERTIFICATE OF CORRECTION

Patent No. 3,495,606      Dated February 17, 1970

Inventor(s) Leonard R. Phillips

It is certified that error appears in the above-identified patent and that said Letters Patent are hereby corrected as shown below:

Col. 4, line 43, following "eyelet" --44-- should be inserted.

Col. 6, line 1, "The" should read --Two--.

Col. 8, line 18, "is" should read --its--.

Col. 8, line 48, "having" should read --have--.

SIGNED AND
SEALED
JUL 21 1970

(SEAL)
Attest:

Edward M. Fletcher, Jr.
Attesting Officer

WILLIAM E. SCHUYLER, JR.
Commissioner of Patents